United States Patent [19]

Ridyard et al.

[11] Patent Number: 5,941,683
[45] Date of Patent: Aug. 24, 1999

[54] GAS TURBINE ENGINE SUPPORT STRUCTURE

[75] Inventors: Philip Ridyard, Mississauga, Canada; Alan G Foster, Derby, United Kingdom

[73] Assignee: Rolls-Royce plc, London, United Kingdom

[21] Appl. No.: 09/025,109

[22] Filed: Feb. 17, 1998

[30] Foreign Application Priority Data

Feb. 22, 1997 [GB] United Kingdom .................... 9703705

[51] Int. Cl.⁶ .................................................. F01D 25/16
[52] U.S. Cl. .................. 415/142; 415/209.2; 415/209.3; 415/209.4; 415/210.1; 416/244 A
[58] Field of Search ............................... 415/142, 209.2, 415/209.3, 209.4, 210.1; 416/244 A, 245 R; 60/226.1

[56] References Cited

U.S. PATENT DOCUMENTS 4,979,872 12/1990 Myers et al. ............................ 415/142
4,987,736 1/1991 Ciokajlo et al. ........................ 60/39.31

*Primary Examiner*—F. Daniel Lopez
*Assistant Examiner*—Ninh Nguyen
*Attorney, Agent, or Firm*—W. Warren Taltavull; Farkas & Manelli PLLC

[57] ABSTRACT

A bearing support structure for a gas turbine engine comprises an annular array of stator vanes and a radially inner bearing support portion which are interconnected by an annular array of radially extending U-shaped cross-section parts. The U-shaped cross-section parts are interconnected at their radially outer extents and are arranged so that adjacent parts are open in generally opposite axial directions. Such a bearing support structure can carry service pipes with good accessibility and be produced by casting, thereby reducing its cost.

6 Claims, 2 Drawing Sheets

GAS TURBINE ENGINE SUPPORT STRUCTURE

This invention relates to a gas turbine engine support structure and is particularly relevant to a support structure for supporting one or more shafts of a ducted fan gas turbine engine.

Ducted fan gas turbine engines typically comprise a number of static support structures which are positioned generally normal to the longitudinal axis of the engine and which carry bearings at their radially inner extents. The bearings in turn support one or more of the main shafts which are positioned coaxially with the engine's longitudinal axis and which carry the rotatable components of the engine, typically rotor aerofoil blades and their associated assemblies. Such support structures are complex components which are required to fulfil a number of different functions. Thus, in addition to performing its primary role of supporting one or more of the main engine shafts, each support structure may also be called upon to carry several service pipes which communicate between the inner and outer regions of the engine. The pipes typically contain such services as oil, air or electricity.

In order for each support structure to be as light as possible, it is typically fabricated from a number of smaller constituent parts which are welded or otherwise joined together. The major parts of the support structure are two axially spaced apart, generally frusto-conical panels which carry a bearing for supporting a shaft at their radially inner extents and are attached to the radially inner platform of a stator aerofoil vane at their radially outer extents.

While such support structures are effective in providing adequate support for their associated bearings and shafts, they are undesirably heavy and expensive to produce in view of the necessity to fabricate them from a number of different constituent parts. It would be desirable to manufacture such support structures by casting in order to save weight and manufacturing costs. However, the typical shape of such support structures precludes the use of this technique.

It is an object of the present invention to provide a gas turbine engine shaft support structure which is of such a configuration that it is easier and cheaper to manufacture than existing equivalent support structures, and which is also capable of carrying service pipes.

According to the present invention a support structure for supporting at least one rotary shaft of a gas turbine engine has a longitudinal axis and comprises a radially inner portion configured to carry at least one bearing for supporting a gas turbine engine shaft, a radially outer portion comprising an annular array of aerofoil vanes adapted for attachment to fixed structure of said gas turbine engine, and a mid-portion interconnecting said radially inner and outer portions, said mid-portion being defined by an annular array of generally radially extending, circumferentially interconnected, generally U-shaped cross-section parts, circumferentially alternate of said U-shaped cross-section parts being open in one generally axial direction and the remainder being open in the opposite generally axial direction.

Said U-shaped cross-section parts may be interconnected only at their radially outer extents.

Said U-shaped cross-section parts are preferably generally axially inclined so that circumferentially, adjacent of said parts are generally axially inclined in opposite axial directions.

Preferably said aerofoil vanes have a stagger angle with respect to the operational direction of gas flow thereover and each of said U-shaped cross-section parts is positioned so that the limbs of its U-shape cross-section lie in planes which are at the same angle to said longitudinal axis as the stagger angle of said aerofoil vanes.

Said support member may be so configured as to be suitable for positioning in a compressor of a gas turbine engine.

Said support structure is a preferably a cast structure.

The present invention will now be described, by way of example, with reference to the accompanying drawings in which.

Figure 1:
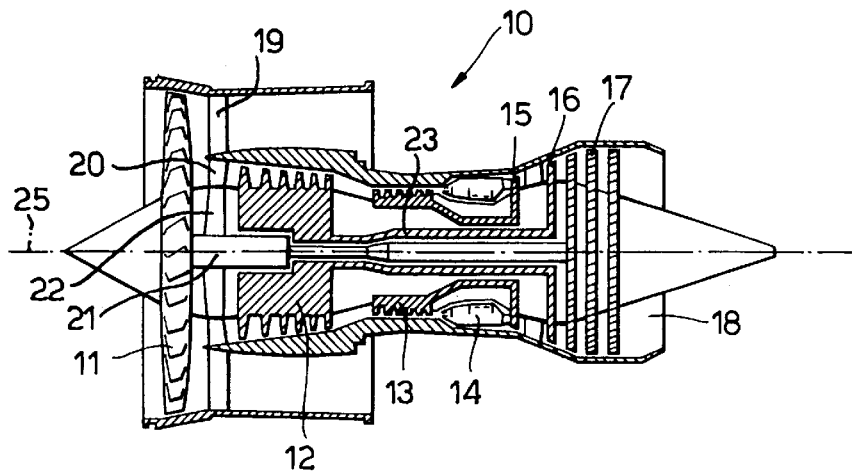
FIG. 1 is a schematic sectioned side view of a ducted fan gas turbine engine having a support structure in accordance with the present invention.

With reference to FIG. 1, a ducted fan gas turbine engine generally indicated at 10 is of generally conventional configuration. It comprises, in axial flow series, a propulsive fan 11, intermediate pressure compressor 12, high pressure compressor 13, combustion equipment 14, high, intermediate and low pressure turbines 15, 16 and 17 respectively and a propulsion nozzle 18. The engine 10 functions in the conventional manner so that air drawn in by the fan 11 is divided into two flows. The first, larger flow is directed over an annular array of outlet guide vanes 19 before being exhausted to atmosphere to provide propulsive thrust. The second, smaller flow is directed over an annular array of aerofoil stator vanes 20 into the intermediate pressure compressor 12 where compression of the air takes place. Further compression of the air takes place in the high pressure compressor 13 before it is exhausted into the combustion equipment 14. There it is mixed with fuel and mixture combusted. The resultant hot combustion products then expand through, and thereby drive, the high, intermediate and low pressure turbines 15, 16 and 17 before being exhausted to atmosphere through the propulsion nozzle 18 to provide additional propulsive thrust.

The fan 11 and low pressure turbine 17 are drivingly interconnected by a rotatable shaft 21. The shaft 21 is supported for rotation within the engine 10 by a number of bearings which are carried by several support structures positioned within the engine 10. One of those support structures 22 is positioned at the upstream end of the engine 10 to support the end of the shaft 21 which carries the fan 11.

Figure 2:
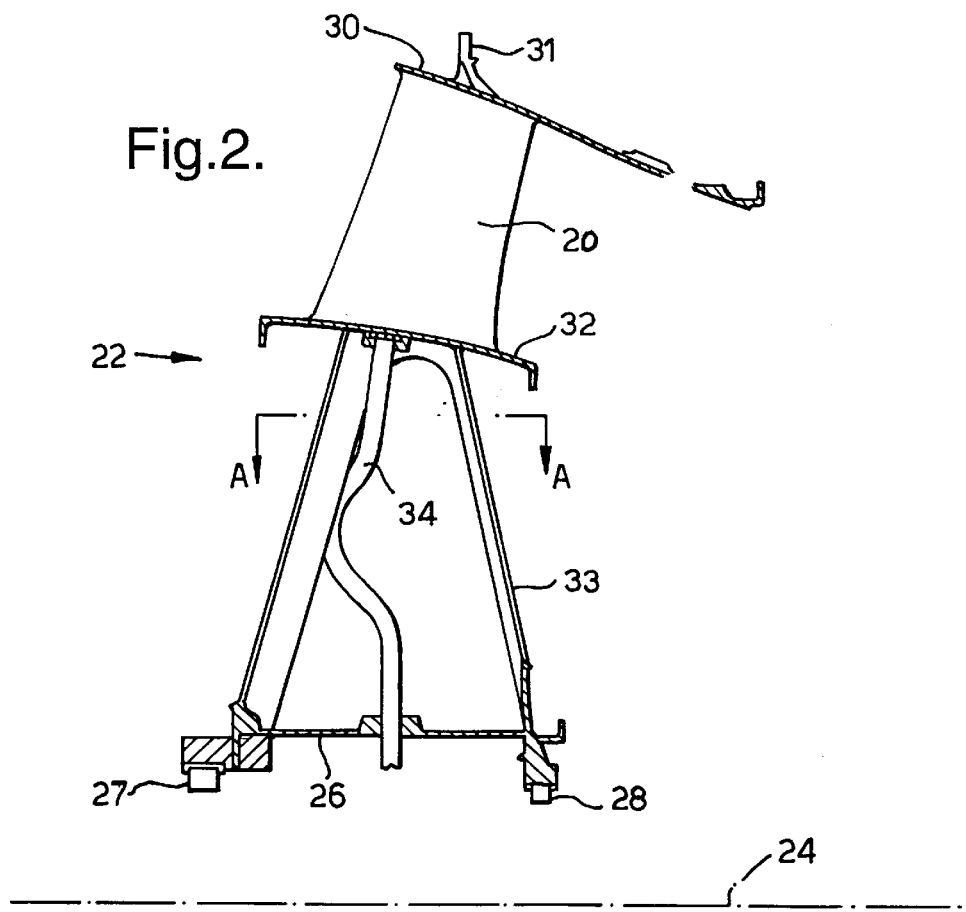
FIG. 2 is a sectioned side view of a support structure in accordance with the present invention.

The support structure 22 can be seen in more detail if reference is now made to FIG. 2. It has a longitudinal axis 24 which is coaxial with the longitudinal axis 25 of the engine 10. The radially inner portion of the support structure 22 comprises an annular bearing support web 26, the upstream part of which carries a first roller bearing 27 which supports the upstream end of the fan shaft 21. The downstream part of the bearing support web 26 carries a second roller bearing 28 which supports the upstream end of a further shaft 23 (shown in FIG. 1). The further shaft 23 drivingly interconnects the intermediate pressure compressor 12 and the intermediate pressure turbine 16.

The radially outer portion of the support structure 22 comprises an annular array of radially extending stator aerofoil vanes 20, the radially outer extents of which are interconnected by, and integral with, a first annular member 30. The first annular member 30 is provided with attachment features 31 which facilitate its attachment to the fixed structure of the engine 10 to thereby secure it in position within the engine 10. Similarly, the radially inner extents of the stator aerofoil vanes 20 are interconnected by a second annular member 32. The first and second annular members 30 and 32 serve to define the radially inner and outer extents of a portion of the gas path over the stator aerofoil vanes 20.

The second annular member 32 and the bearing support web 26 are interconnected by an annular array of generally radially extending U-shaped cross-section members 33. The structure and arrangement of members 33 can be seen most clearly if reference is made to FIGS. 3 and 4. Each member 33 is open in either a generally upstream or a generally downstream direction. More specifically, the members 33 circumferentially alternate between those which are open in a generally upstream direction and those which are open in a generally downstream direction. Each member 33 is connected at its radially outer extent to the member 33 circumferentially adjacent thereto, although it will be appreciated that it may be desirable in certain circumstances for adjacent members 33 to be interconnected along the whole of their radial extents.

Figure 3:
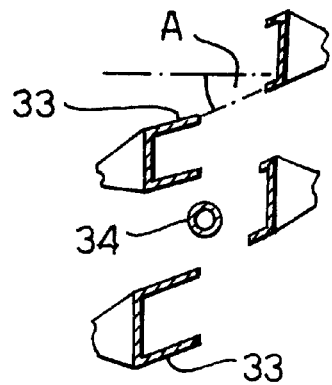
FIG. 3 is a view on section line A—A of FIG. 2.
Figure 4:
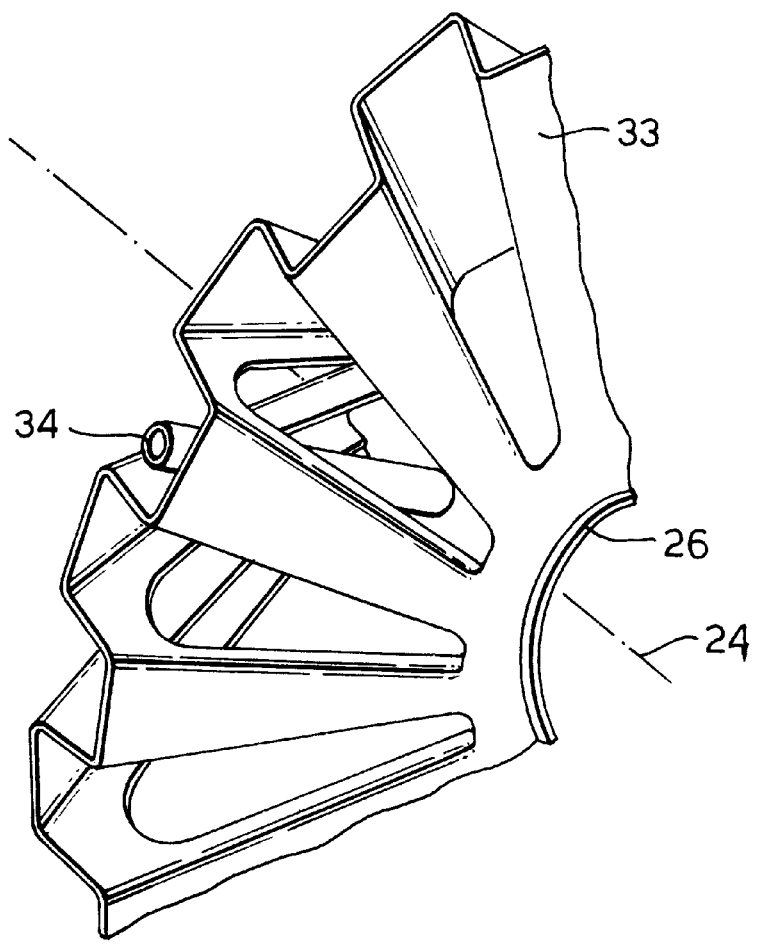
FIG. 4 is a general view of a portion of the support structure shown in FIG. 1, the radially outer part of the structure having been omitted in the interests of clarity.

As can be seen most clearly in FIG. 3, each of the members 33 is so configured that each of the limbs of its U-shape cross-section lies in plane which is inclined by a small angle A to the longitudinal axis 24 of the support member 22. The angle A coincides approximately with the root stagger angle of each of the stator aerofoil vanes 20. This is the angle at which each stator aerofoil vane 20 is incident to the general direction of the airflow which passes over it. Additionally, each of the members 33 is inclined axially so that circumferentially, the members 33 are alternately inclined in the upstream and downstream directions. Inclining the members 33 in these ways provides the necessary overall strength and rigidity to the support member 22.

The configuration of the members 33 ensures that there is sufficient accessible space between the limbs of each member 33 to accommodate service pipes, such as the one indicated at 34. The service pipe 34, is one of many which carry oil, air or electricity between the radially inner and outer regions of the engine 10.

It will be seen therefore that the configuration of the support member 22 is such that it can be manufactured by casting, thereby reducing its cost, and is capable of accommodating service pipes while still having acceptable strength and rigidity characteristics.

We claim:

1. A support structure for supporting at least one rotary shaft of a gas turbine engine having a longitudinal axis and comprising a radially inner portion configured to carry at least one bearing for supporting a gas turbine engine shaft, a radially outer portion comprising an annular array of aerofoil vanes adapted for attachment to fixed structure of said gas turbine engine, and a mid-portion interconnecting said radially inner and outer portions, said mid-portion being defined by an annular array of generally radially extending, circumferentially interconnected, generally U-shaped cross-section parts, circumferentially alternate of said U-shaped cross-section parts being open in one generally axial direction and the remainder being open in the opposite generally axial direction.

2. A support structure as claimed in claim 1 wherein said U-shaped cross-section parts are interconnected only at their radially outer extents.

3. A support structure as claimed in claim 1 wherein said U-shaped cross-section parts are generally axially inclined so that circumferentially adjacent of said parts are generally axially inclined in opposite axial directions.

4. A support structure as claimed in claim 1 wherein said aerofoil vanes have a stagger angle with respect to the operational direction of gas flow thereover and each of said U-shaped cross-section parts is positioned so that the limbs of its U-shape cross-section lie in planes which are at the same angle to said longitudinal axis as the stagger angle of said aerofoil vanes.

5. A support structure as claimed in claim 1 wherein said support member is so configured as to be suitable for positioning in a compressor of a gas turbine engine.

6. A support structure as claimed in claim 1 wherein said support structure is a cast structure.

* * * * *